United States Patent Office 3,516,277
Patented June 23, 1970

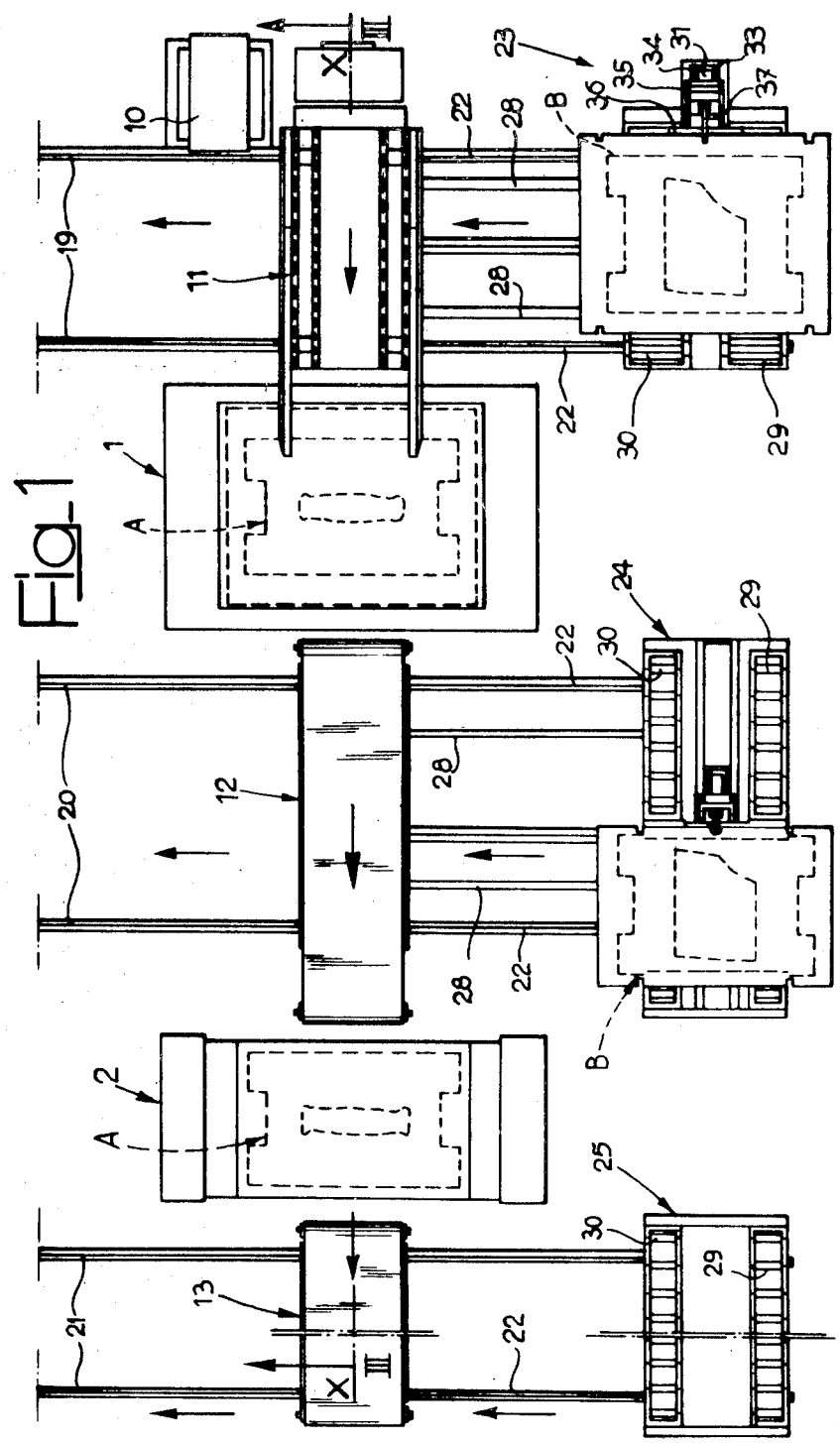

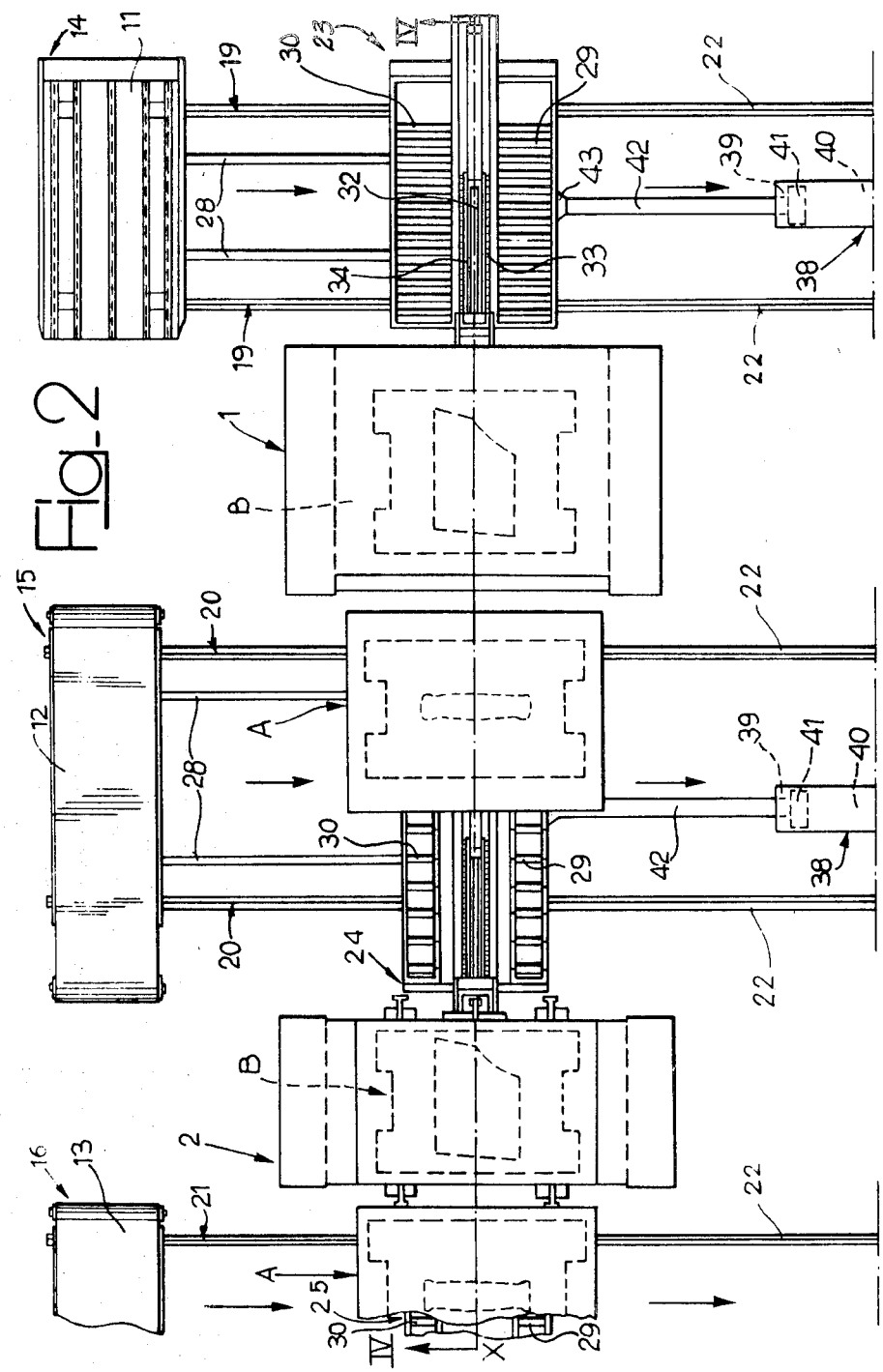

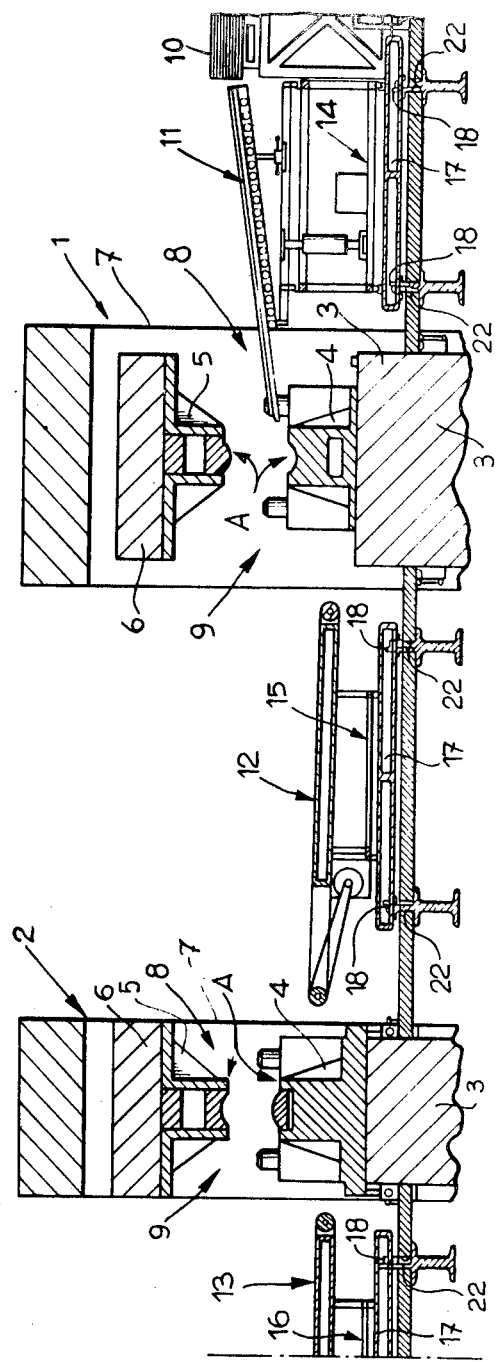

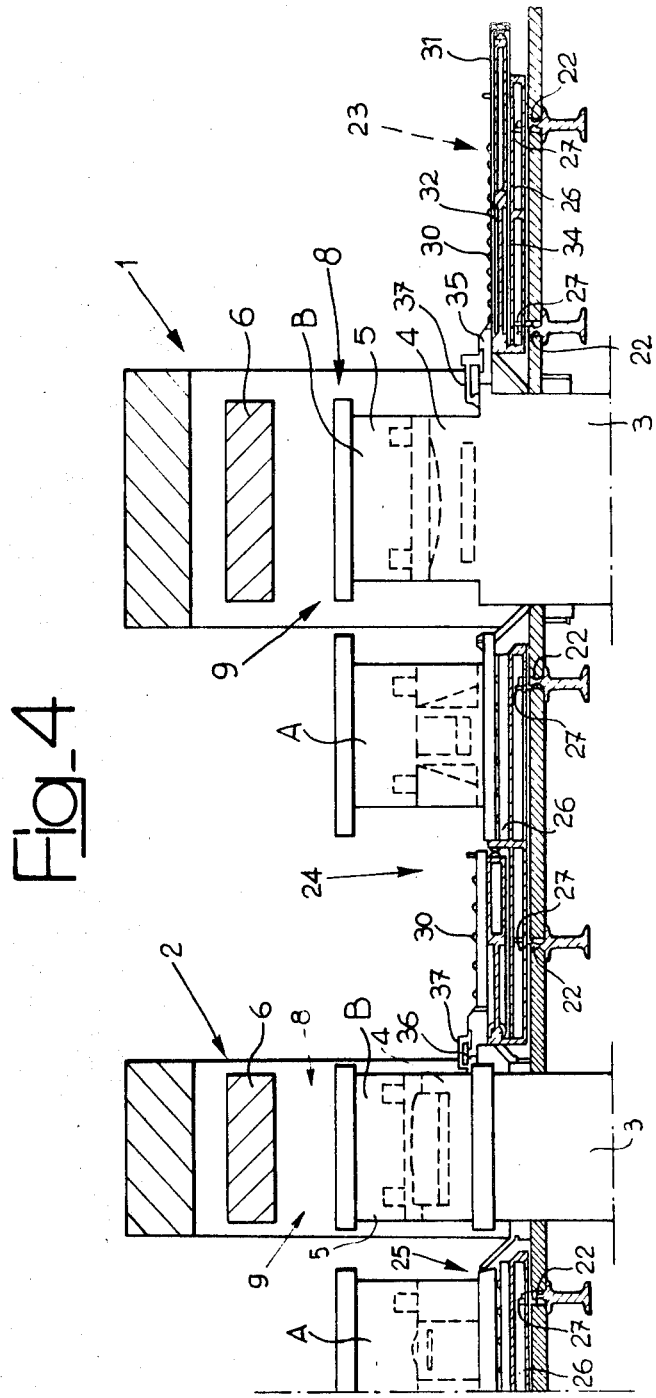

3,516,277
WORKPIECE FEED AND DIE CHANGE DEVICE
Cesare Bracco and Sergio Taverna, both of 200 Corso
Giovanni Agnelli, Turin, Italy
Filed June 5, 1967, Ser. No. 643,669
Claims priority, application Italy, June 7, 1966,
13,222/66
Int. Cl. B21j 13/10
U.S. Cl. 72—446                                      8 Claims

ABSTRACT OF THE DISCLOSURE

The present disclosure is concerned with facilitating the removal and replacement of dies in presses. Generally, sheet metal and other presses are arranged in a sequence with roller conveyors therebetween for the conduction of workpieces to and from the presses along an axis. Usually also replacing or changing the dies in the presses requires the removal of the conveyors to make room for the dies and their handling means. In accordance with the present disclosure carriage pairs are provided in association with each press, one carriage of each pair being provided with a roller conveyor arrangement and hydraulic pusher for carrying a die and the other carriage of each pair being provided with a conveyor arrangement for the workpieces. The hydraulic pusher arrangement is provided for moving the carriage pair transversely to the axis along which the presses lie so that a chosen carriage of the carriage pair may be aligned with the presses in accordance with the requirement to provide a workpiece or a die to a press.

---

The invention relates to devices for fitting workpieces to sets of presses adapted sequentially to press them and for changing the dies in the presses. The invention relates more particularly to such devices for use in the pressing of sheet metal for instance metal vehicle body parts.

According to a known method of pressing body parts, a set of presses are employed which are arranged along a common axis and interconnected by conveyors. The sheet metal is fed by a first conveyor to the first press in the set and is subsequently transferred by further conveyors to the further presses for sequential processing, the finished parts leaving the last press. In each press in the set, pressing is effected by means of a divided die, the bottom half of which die is secured to a bedplate and the top half of which is secured to a ram. This ram is mounted for vertical displacement in a frame whcih overlies the bedplate and is formed on two opposite sides with openings for respectively receiving the sheet metal and removing the mouldings. The dies are also introduced and removed through these openings.

The die change step is always a cumbersome one and is particularly lengthy when the dies are of considerable size. This is because the step involves removal of the conveyors which interconnect the presses in order to provide the space necessary for accommodating the means needed for handling the dies. As a result, the presses are of necessity out of action during the time required for changing the dies.

An object of the present invention is to obviate the above drawbacks by simplifying and shortening the die change steps.

According to these and other objects, the invention consists in a workpiece feed and die change device for presses arranged in spaced relationship along a common axis, the device comprising a plurality of conveyors arranged intermediate the presses for transferring the workpieces along the said axis from one press to another and wherein each conveyor is mounted on a first carriage which is displaceable transversely of the said common axis and which has secured thereto a lateral extension in the form of a further carriage extending transversely of the said common axis, each further carriage having a supporting table adapted to carry a die and means being provided for together displacing each carriage pair between two end positions in one of which each conveyor lies along the said axis and each supporting table is spaced therefrom, and in the other of which each supporting table is arranged along the said axis and each conveyor is spaced therefrom.

These and other objects and advantages will be clear from the accompanying drawings which are given by way of example and in which:

FIGS. 1 and 2 are plan views of a feed and change device for a set of presses according to the invention, the two figures showing respectively two operative positions of the said device; and FIGS. 3 and 4 are sectional views taken along line 3—3 of FIG. 1 and line 4—4 of FIG. 2 respectively.

In the figures the device is shown in association with a set of two presses 1 and 2 which are arranged along a common axis X—X.

As shown in FIGS. 3 and 4, each press comprises a bedplate 3. During use of the press the bedplate 3 has secured thereto, in a known manner, not shown, one half 4 of a die A and the other half 5 of each die is secured to a ram which is mounted for vertical displacement in a frame 7. As shown, the said frame is formed in its opposite sides with openings 8, 9 through which the workpieces, e.g. sheet metal and dies, may be fed and removed.

The press frames 7 of a set are so situated along the axis X—X that the openings 8 and 9 are arranged parallel to the said axis.

A conveyor 11 for sheet metal 10 registers with the opening 8 of the press 1 and a conveyor 12 is arranged between the opposed openings 8 and 9 of the presses 1 and 2. This latter conveyor serves to transfer workpieces from the press 1 to the press 2 in order that the pressing operations may be completed. After such completion, the pressed parts are removed from press 2 through the opening 9 thereof and are placed on a conveyor 13 by which they are conveyed away, for instance, to storage.

In accordance with the invention the conveyors 11, 12 and 13 are mounted on carriages 14, 15, 16 respectively, each said carriage having a frame 17 mounted on wheels 18. As best shown in FIG. 1, the carriages 14, 15, 16 are mounted for travel over tracks 19, 20, 21 respectively, each said track comprising two rails 22 arranged transversely to the axis X—X.

As shown in FIG. 1 and in FIG. 4, the carriages 14, 15, 16 are each provided with a lateral extension in the form of a further carriage 23, 24, 25, respectively, each said further carriage comprising a frame 26 mounted on wheels 27 (see FIG. 4) which also travels over the aforementioned rails 22 of the respective tracks 19, 20, 21. The frames of the two carriages which travel a same track are rigidly interconnected in pairs by means of rods 28. If desired, these rods may be prevented from encroaching on the space which exists between the carriages of a pair by their arrangement beside the rails 22 rather than between them as shown.

The carriages 23, 24, 25 are each provided with means to be described hereinafter for controlling their movement forward each carriage 23, 24, 25 together with an associated carriage 14, 15, 16 respectively, and associated said interconnecting rods 28.

A die-supporting table is mounted on the frame 26 of each carriage 23, 24, 25, each said table comprising a parallel pair of roller conveyors 29, 30 which themselves extend parallel to the axis X—X and are co-planar with the bedplates 3 of the presses 1 and 2.

A separate die B is placed on the supporting table of each of the two carriages 23 and 24, and each die B is adapted to press a body part of some form other than that pressed by the dies A which are mounted on the presses 1, 2. A hydraulic pusher is arranged between and parallel to the conveyors 29 and 30 of each supporting table, and each said hydraulic pusher comprises a cylinder 31 secured to the frame of its respective carriage and a stem 32 which is operable on a slide 35 extending from the supporting table through two drive chains 33, 34. The slides 35 are each provided with a spur 36 and a hook 37 adapted to engage the die B for moving it along the conveyors 29, 30 parallel to axis X—X when pressure fluid, e.g. oil, is fed into the cylinder 31. The details of the hydraulic pusher are more fully disclosed in applicants' U.S. Pat. No. 3,455,141, granted July 15, 1969.

A hydraulic pusher is also arranged between and parallel to the rails 22 of each track 19, 20, 21 and each of these said pushers comprises a stationary cylinder 38 which is sub-divided into two working chambers 39, 40 by a piston 41. The piston 41 carries a rod 42, the end 43 of which is secured to the frame 26 of the respective carriage 23, 24, 25.

When pressure fluid, e.g. oil, is fed to the chambers 39 of the cylinders 38, the carriage pairs 14, 23; 15, 24; 16, 25 are moved over their respective tracks 19, 20, 21 transversely of the axis X—X into their first operative position wherein, as shown in FIGS. 1 and 3, the conveyors 11, 12 and 13 are all arranged along the said axis X—X and the supporting tables formed by the conveyors 29, 30 are spaced apart from, but are still parallel to, the said axis.

When pressure fluid, e.g. oil, is fed to the chambers 40 of the cylinders 38, the carriage pairs are moved over their respective tracks 19, 20, 21 into their second operative position wherein, as shown in FIGS. 2 and 4, the axes of the supporting tables of the carriages 23, 24, 25 are arranged along the axis X—X and the conveyors 11, 12, 13 are spaced apart from but are still parallel to the said axis.

In order to substitute the dies B for the dies A, the halves 4, 5 of the dies A are respectively released from their relative plates 3 and rams 6, which latter have been previously lowered. The rams 6 are then lifted to free the dies and the carriage pairs are each moved into their second operative position (FIGS. 2 and 4). The pushers mounted on the carriages 23, 24 are then operated to push the dies B, which are carried by the said carriages, towards the presses 1 and 2. As a result of this displacement each die B abuts its corresponding die A, which corresponding dies are all now freely resting on the beds of their respective presses and each said die B pushes its corresponding die A along the axis X—X and onto the corresponding carriage 24, 25 which is arranged on the opposite side of the respective press 1, 2.

The dies B may be precision aligned on their respective plates 3 by controlled operation of the pushers mounted on the carriages 23, 24, the dies B being pulled by the hooks 37 and pushed by the spurs 36. Thereafter the rams 6 are lowered to secure the dies B to their respective presses and the carriage pairs are restored to their first operative position (FIGS. 1 and 3) in order to prepare the set of presses for the pressing operation.

Various modifications of the invention are of course possible within the scope of the appended claims.

For instance, although the device has been shown in association with only two presses it can of course be associated with any number thereof.

What we claim is:

1. Workpiece feed and die change device for presses arranged in spaced relationship along a common axis, the device comprising:
(A) a plurality of conveyors arranged intermediate the presses for transferring the workpieces along the said axis from one said press to another, and wherein the improvement resides in the fact that there are also provided a plurality of first carriages and further carriages interconnected one with the other, each said conveyor being mounted on a said first carriage which is displaceable transversely of the said common axis with a said further carriage which is secured thereto and extends transversely of the said axis, each said further carriage having a supporting table adapted to carry a die and means being provided for displacing each said carriage pair, comprising a first carriage and a further carriage, between two end positions in one of which each said conveyor lies along the said axis and each said supporting table is spaced therefrom and in the other of which each said supporting table is arranged along the said axis and each said conveyor is spaced therefrom.

2. Device as claimed in claim 1, wherein in each first carriage a frame carries the associated conveyor and in each further carriage a frame carries the associated supporting table for the die.

3. Device as claimed in claim 1, wherein the said first and further carriages are adapted each to travel over a track arranged transversely of the common axis of the presses.

4. Device as claimed in claim 3, wherein the said tracks each comprise rails and the said first and further carriages each comprise frames with wheels adapted to engage the said rails.

5. Device as claimed in claim 4, wherein the said first and further carriages are rigidly interconnected into the said pairs by the provision of rods.

6. Device as claimed in claim 5, wherein the said rods are arranged externally of the said rails thereby to leave the space therebetween unencumbered.

7. Device as claimed in claim 1, wherein the said means for displacing the said carriage pairs comprise a plurality of hydraulic pushers.

8. Device as claimed in claim 7, wherein the said hydraulic pushers are controlled by oil under pressure.

References Cited

UNITED STATES PATENTS

| 2,543,498 | 2/1951  | Japikse  | 100—299 |
| 2,965,369 | 12/1960 | Acker    | 100—299 |
| 3,002,479 | 10/1961 | Johansen | 72—446  |
| 3,316,834 | 5/1967  | Draganti | 100—214 |

FOREIGN PATENTS 950,884  2/1964  Great Britain.

CHARLES W. LANHAM, Primary Examiner

G. P. CROSBY, Assistant Examiner

U.S. Cl. X.R.

100—215, 218